United States Patent

Haas

(10) Patent No.: US 8,201,835 B2
(45) Date of Patent: Jun. 19, 2012

(54) REPLACEABLE CHUCK

(75) Inventor: Günter Haas, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 988 days.

(21) Appl. No.: 12/221,799

(22) Filed: Aug. 5, 2008

(65) Prior Publication Data

US 2009/0051129 A1 Feb. 26, 2009

(30) Foreign Application Priority Data

Aug. 20, 2007 (DE) .................... 10 2007 000 453

(51) Int. Cl.
*B23B 31/107* (2006.01)

(52) U.S. Cl. ................ 279/75; 279/902; 279/905

(58) Field of Classification Search ............ 279/74, 279/75, 82, 902, 904, 905
See application file for complete search history.

(56) References Cited

U.S. PATENT DOCUMENTS

| | | | | | |
|---|---|---|---|---|---|
| 3,070,380 | A | * | 12/1962 | Holmberg | 279/51 |
| 3,507,337 | A | * | 4/1970 | Chromy | 173/14 |
| 3,985,368 | A | * | 10/1976 | Better et al. | 279/75 |
| 4,434,859 | A | * | 3/1984 | Rumpp et al. | 173/48 |
| 4,491,444 | A | * | 1/1985 | Rumpp et al. | 409/234 |
| 4,626,146 | A | * | 12/1986 | Neumaier | 408/239 R |
| 4,691,929 | A | * | 9/1987 | Neumaier et al. | 279/19.3 |
| 5,222,848 | A | * | 6/1993 | Kuang-Wu | 408/239 R |
| 5,340,129 | A | * | 8/1994 | Wright | 279/90 |
| 5,603,516 | A | * | 2/1997 | Neumaier | 279/19.5 |
| 6,089,330 | A | * | 7/2000 | Miescher et al. | 173/132 |
| 6,241,026 | B1 | * | 6/2001 | Wache et al. | 173/132 |
| 6,536,780 | B2 | * | 3/2003 | Baumann et al. | 279/19.4 |
| 6,820,700 | B2 | * | 11/2004 | Funfer et al. | 173/132 |
| 6,988,734 | B2 | * | 1/2006 | Zierpka | 279/75 |
| 2006/0192350 | A1 | * | 8/2006 | Kleine et al. | 279/19.3 |
| 2007/0024013 | A1 | * | 2/2007 | Hauptmann et al. | 279/75 |

\* cited by examiner

*Primary Examiner* — Daniel Howell
*Assistant Examiner* — Paul M Janeski
(74) *Attorney, Agent, or Firm* — Abelman, Frayne & Schwab

(57) ABSTRACT

A replaceable chuck for a percussion hand-held power tool (3) for applying axial blows to a working tool receivable in the chuck, includes a release sleeve (4) axially displaceable relative to the base body (6) against a spring-biasing force and including an inwardly located locking element (11) for formlockingly securing the chuck on a power tool spindle (15) with locking elements (12) extending through respective openings (13) formed in a base body (6) and engageable in associated recesses (14) of the power tool spindle (15), and a formlocking displacement guide (5) that provides for displacement of the release sleeve (4) relative to the base body (6) and includes, along its axial extension, a tangential section.

4 Claims, 2 Drawing Sheets

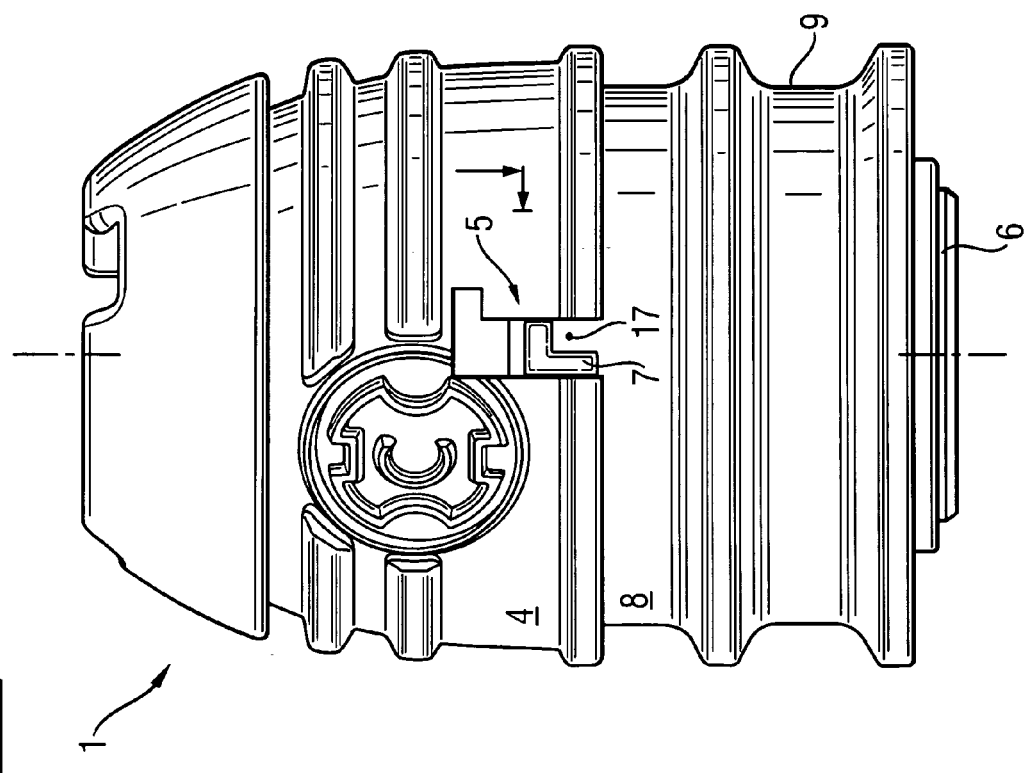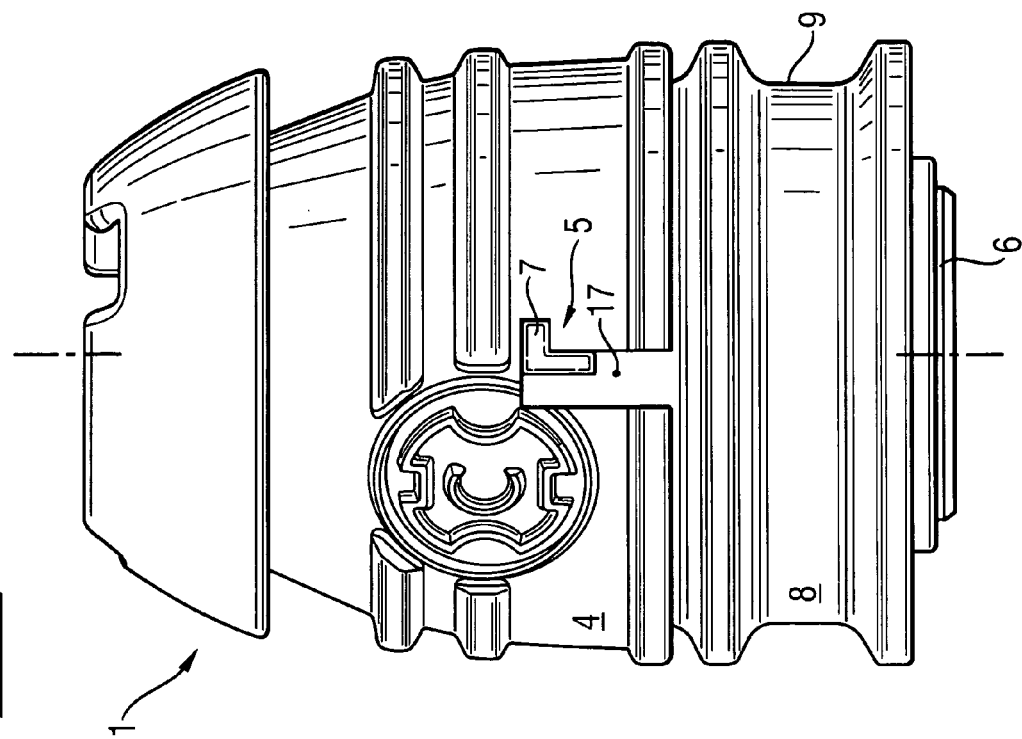

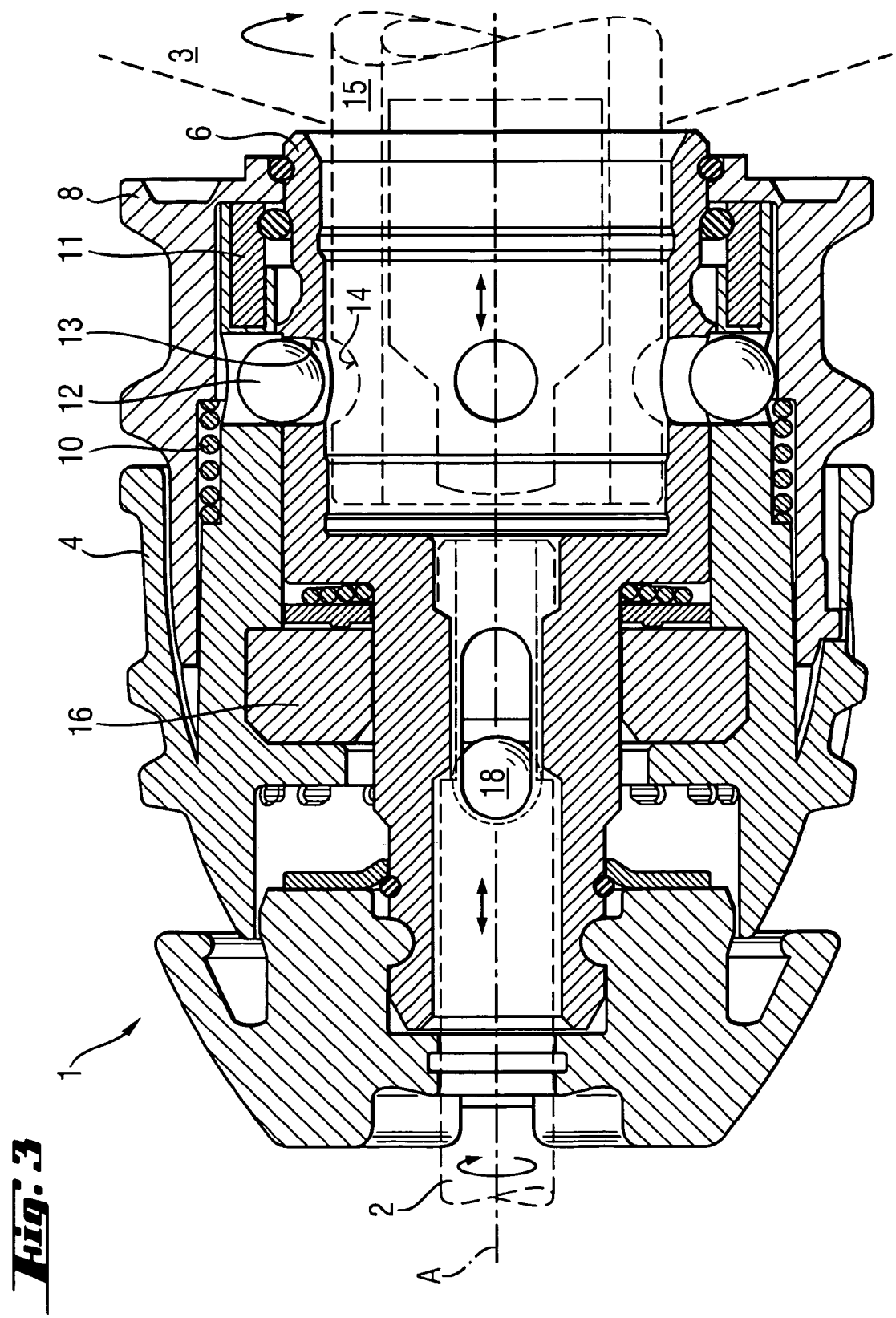

REPLACEABLE CHUCK

BACKGROUND OF THE INVENTION

1. Field of the Invention

The present invention relates to a replaceable chuck for a percussion hand-held power tool such as, e.g., a combination hammer or a chisel hammer.

2. Description of the Prior Art

Replaceable chucks are usually releasably and replaceably secured in a hand-held power tool with a hand, without any auxiliary tool, using a manually radially displaceable, within certain limits, release sleeve that includes inwardly located locking means for formlockingly securing the chuck on a power tool spindle, with locking elements such as balls, extending through respective openings formed in the base body of the chuck and engageable in associated recesses of the power spindle. An anvil of a percussion mechanism of the power tool, which is axially displaceable, within certain limits, in the interior of the power tool spindle, applies direct blows to the impact tool receivable in the chuck. For securing the impact tool in the chuck, the chuck is provided usually, in addition to the release sleeve for securing the chuck and which is arranged on tool-side of the chuck, with another manually displaceable release sleeve, which is arranged on the impact tool-side of the chuck, for securing the working tool in the chuck.

U.S. Pat. No. 4,824,298 discloses a chuck a power tool-side release sleeve of which forms a manually tangentially displaceable, twist-on locking means for securing the ball-shaped locking element and having an inwardly located annular locking means that forms a circumferential, radially variable, locking guide.

German Publication DE 10 2004 042 465 discloses a replaceable chuck having a working tool-side release sleeve and a power tool-side release sleeve axially manually displaceable, against a spring-biasing force. The power tool-side release sleeve includes inwardly located locking means for formlockingly securing the chuck on a power tool spindle with balls extending through respective openings formed in the base body of the chuck and engageable in associated recesses on the power tool spindle. In high-power hand-held tools, in case of an idle stroke impact, the locking of the balls in the spindle recesses is not very reliable because of inertia forces that are generated by an impact load and cause strong axial vibrations of the release sleeve. The strengthening of the spring that preloads the power tool-side release sleeve, is limited by the user acceptance.

Accordingly, an object of the present invention is a replaceable chuck release sleeve of which is reliably secured on the drivable power tool spindle even at high impact loads.

SUMMARY OF THE INVENTION

This and other objects of the present invention, which will become apparent hereinafter, are achieved by providing a replaceable chuck for a percussion hand-held power tool for applying axial blows to a working tool receivable in the chuck, with the chuck having a release sleeve axially displaceable relative to the base body of the chuck against a spring-biasing force and including inwardly located locking means for formlockingly securing the chuck on a power tool spindle with locking elements that extend through respective openings formed in the base body and engageable in associated recesses on the power tool spindle, and a formlocking displacement guide that provides for displacement of the release sleeve relative to the base body and includes, along an axial extension of the guide, a tangential section.

With the displacement guide having a tangential section along its axial extent, the release sleeve must be displaced, for releasing the chuck, in following each other steps, both axially and tangentially. On the assumption that both rotational and percussive stochastic vibration generation provides, without a displacement guide, for a sufficient displacement of the release sleeve from a locking position into an axially and tangentially offset release position, this vibration generation would not be sufficient for displacement of the release sleeve into the release position when a displacement guide is used. This is because the axial and tangentially offset linear vibration generation would be damped by the displacement guide.

The adjacent in time, pure axial vibration generation and pure tangential vibration generation exclude respective sufficient displacements of the release sleeve because of a limited probability of occurrence, resulting from the statistic independence of both vibration generations, which displacements are practically nill.

Advantageously, the displacement guide is formed as a pin-slot guide formed of a radially projecting pin and a slot, with the pin being formlockingly displaceable along a profile of the slot. Thereby, a robust displacement guide is realized.

Advantageously, there is provided, in the chuck, a gripping sleeve fixedly connected with the base body, located adjacent to a power tool-side of the release sleeve, and coaxially, at least partially axially, extending into an interior of the release sleeve. The pin is arranged on the gripping sleeve, and the slot is formed in the release sleeve. This permits to realize a technologically simple displacement guide that can be produced using injection-molding technology.

Advantageously, the pin is formed as a L-shaped pin that becomes self-locked in the axially and tangentially offset section of the slot in a release position of the chuck under a preload. Thereby, the chuck can be replaced without any further manual efforts requiring expenditure of force.

Advantageously, the gripping sleeve has a circumferential finger-receiving groove opening radially outwardly. Thereby, the gripping sleeve can be ergonomically gripped with the finger of the actuation hand for displacing the working tool-side release sleeve relative to the gripping sleeve.

Advantageously, the release sleeve includes inwardly located locking means for securing an impact tool in the chuck. The handling of the release sleeve is intuitive, with the release of the working tool being effected only with a partial step (with only axial displacement) that forms only a part of the entire step for release of the chuck (axial and, finally, tangential displacement).

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 1 a front elevational view of a replaceable chuck according to the present invention in a chuck locking position;

FIG. 2 a front elevational view of replaceable chuck according to the present invention in a chuck release position; and FIG. 3 a longitudinal cross-sectional view of the replaceable chuck according to the present invention in the chuck release position.

DETAILED DESCRIPTION OF THE PREFERRED EMBODIMENTS

A replaceable chuck 1 according to the present invention, which is shown in FIG. 1, includes a release sleeve 4 having a formlocking displacement guide 5 that has a tangential section along its axial extent. The displacement guide 5 is formed as a pin-slot guide, with a radially projecting pin 7 formlockingly displaceable along a profile of a radially open slot 17. The pin 7 is arranged on a gripping sleeve 8 that is fixedly connected with a base body 6 and is located adjacent to a power tool-side of the release sleeve 4. The gripping sleeve 8 partially axially extends into the release sleeve 4 coaxially therewith. The slot 17, which is associated with the pin 7, is formed in the release sleeve 4. The gripping sleeve 8 further has a circumferential finger-receiving groove 9 opening radially outwardly.

As shown in FIG. 2, the pin 7 is formed as an angle that, in a release position, is automatically locked in a tangential section of the slot 17 as a result of an axial preload.

As shown in FIG. 3, in the chuck 1 of a hand-held power tool 3 that applies blows to an impact tool 2 along an axis A, the release sleeve 4 is axially displaceable relative to the gripping sleeve 8, which itself is fixedly connected with the base body 6, against a biasing force of a helical spring 10. The release sleeve 4 has an inwardly located, annular locking member 11 for radially formlockingly locking the chuck 1 with locking elements 12 in form of balls. The balls are radially displaceably arranged in openings 13 provided in the base body 6. In the locking position of the chuck 1, the balls engage in associated recesses 14 of a rotatable power tool spindle 15. In addition, the release sleeve 4 has inwardly located locking means 16 for a tool locking member 18 in form of a ball.

The handling of the chuck is intuitive, with release of the impact tool corresponding only to a portion of the axial displacement (FIG. 1), and with a subsequent tangential displacement being necessary for release of the chuck.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A replaceable chuck for a percussion hand-held power tool (3) for applying axial blows to a working tool receivable in the chuck, the chuck comprising a base body (6); and a release sleeve (4) axially displaceable relative to the base body (6) against a spring-biasing force and including inwardly located locking means (11) for formlockingly securing the chuck on a power tool spindle (15) with locking elements (12) extending through respective openings (13) formed in the base body (6) and engageable in associated recesses (14) on the power tool spindle (15), and a formlocking displacement guide (5) that provides for displacement of the release sleeve (4) relative to the base body (6) and includes along an axial extension of the guide (5), a tangential section, wherein the displacement guide (5) is formed as a pin-slot guide formed of a radially projecting pin (7) and a slot (17), with the pin (7) being formlockingly displaceable along a profile of the slot (17), and wherein the pin (7) is formed as a L-shaped pin that becomes self-locked in the tangential section of the slot (17) in a release position of the chuck.

2. A replaceable chuck according to claim 1, wherein the chuck further comprises a gripping sleeve (8) fixedly connected with the base body (6), located adjacent to a power tool-side of the release sleeve (4) and coaxially, at least partially axially, extending into an interior of the release sleeve (4), and wherein the pin (7) arranged on the gripping sleeve (8), and the slot (17) is formed in the release sleeve (4).

3. A replaceable chuck according to claim 1, wherein the gripping sleeve (8) has a circumferential finger-receiving groove (9) opening radially outwardly.

4. A replaceable chuck according to claim 1, wherein the release sleeve (4) includes inwardly located locking means (16) for securing a working tool (2) in the chuck.

* * * * *